Jan. 22, 1924.  1,481,369
A. C. HOTTENROTH
ELECTRICAL COOKING AND HEATING MEANS
Original Filed Sept. 1, 1921
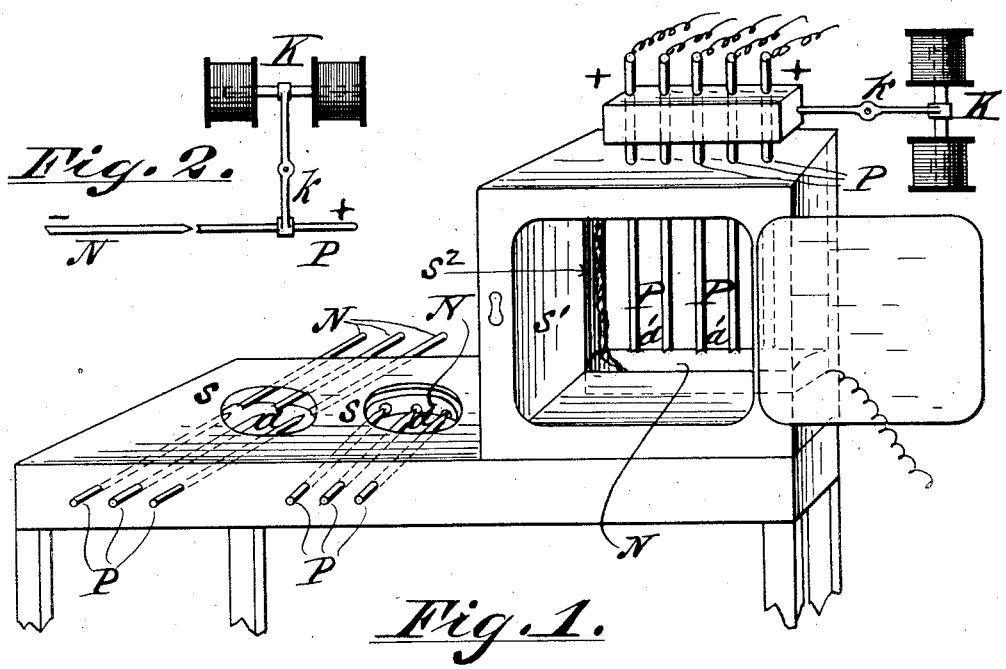
Fig. 2.
Fig. 1.
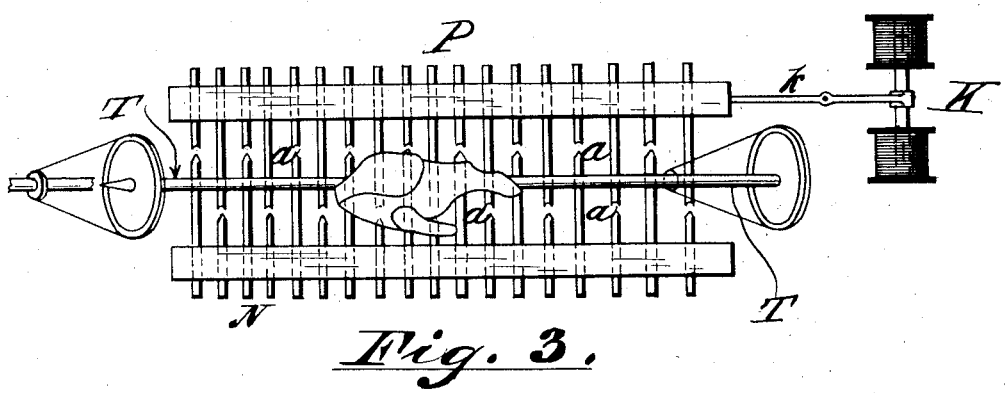
Fig. 3.
Inventor:
Adolph C. Hottenroth,
By his Attorney, Geo. W. Hiatt Patented Jan. 22, 1924.

1,481,369

UNITED STATES PATENT OFFICE.

ADOLPH C. HOTTENROTH, OF FREEPORT, NEW YORK.

ELECTRICAL COOKING AND HEATING MEANS.

Application filed September 1, 1921, Serial No. 497,691. Renewed May 24, 1923.

*To all whom it may concern:*

Be it known that I, ADOLPH C. HOTTENROTH, a citizen of the United States, and a resident of Freeport, county of Queens, and State of New York, have invented certain new and useful Improvements in Electrical Cooking and Heating Means, of which the following is a specification.

My improvements relate to electrical means for cooking and analogous purposes, and are designed more especially for use in the preparation of food as, by roasting, boiling, stewing, broiling, frying, etc. I am aware that electrical resistance coils have been used for heating purposes and for toasters, chafing dishes and other forms of cooking utensils, and I expressly disclaim such means of electrical heating.

In my concurrent application Serial No. 491,089, filed August 10, 1921, I describe and claim the utilization of the electric arc as a means of heating a liquid vehicle flowing in juxtaposition thereto, the intense heat emanating from the arc being communicated to, or absorbed by, the fluid vehicle so as to be available for use, where and as required, at a distance from such source of heat.

My present invention consists essentially in the use of the electric arc for cooking, boiling, etc., by direct heat radiation therefrom,—without the interposition of a liquid heat vehicle,—the substance to be cooked or heated being exposed in close proximity to one or a series of electric arcs by suitable supporting means, substantially as herein set forth.

In the accompanying drawings I illustrate, more or less diagrammatically and symbolically, means and appliances for the practical utilization of my invention, although I do not confine myself to details in this respect, since various modifications in the construction and arrangement of parts and apparatus may be resorted to as may be found expedient in adapting the principle to varying practical requirements without departing from the spirit and intent of my invention, which contemplates broadly and basically the utilization of the electric arc as a medium for imparting heat directly to liquid or food a substance to be treated for culinary purposes by positioning said substance in juxtaposition thereto in a manner, and by means which insure the impact thereagainst of the thermic rays generated by the electric arc.

With this understanding:—

Fig. 1, is a perspective view representing more or less diagrammatically the essential features of my invention as embodied in an electric arc cooking stove and oven;

Fig. 2, is a symbolic representation of means for effecting the automatic regulation of the arc carbons;

Fig. 3, is an illustration of the principle of my invention as applied to a rotisserie or rotatable broiling spit.

In Fig. 1, S, represents the metallic frame work of a stove comprising a flat table formed with circular openings $s, s$, for the exposure of cooking utensils directly to the heat generated by electric arcs $a, a$, positioned beneath said openings $s, s;$ and also comprising an oven $s'$, heated by electric arcs $a', a'$, preferably positioned behind a metallic partition $s^2$, shown in part in said Fig. 1. The negative carbons N, are positively fixed in position, and may consist either of a series of pencils as on the left of Fig. 1, or of a block of carbon as indicated at the middle and the right of said figure, the positive carbons P, being regulated automatically as related to the negative by means well known in the art, and as indicated symbolically in the drawings by the coils K, K, and levers $k, k$.

In Fig. 3, a bank of positive carbons P, and negative carbons N, are indicated as arranged to afford a series of electric arcs $a, a$, in conjunction with a turn spit T, of the rotisserie type, for the cooking of meat impaled on said spit.

Obviously, by the use of suitable switching and rheostatic mechanism well known in the art of electric arc lighting, the generation of heat to be imparted to the substances to be heated or cooked by direct caloric radiation may be regulated according to requirements.

What I claim as my invention and desire to secure by Letters Patent is,

1. Electric culinary apparatus of the character designated, comprising an electric arc, and means for supporting and positioning a substance to be treated in juxtaposition thereto in such manner as to expose said substance directly to the radiant heat emanating from said electric arc, substantially as set forth.

2. Electric culinary apparatus of the character designated, comprising a plurality of electric arcs arranged to act in conjunction, and means for supporting and positioning a substance to be treated in juxtaposition thereto in such manner as to expose such substance directly to the radiant heat emanating from said plurality of electric arcs, substantially as set forth.

3. The method herein disclosed of utilizing the heat generated by electric arc means for culinary purposes, consisting in exposing the substance to be treated directly to the heat emanating therefrom, substantially in the manner and for the purpose described.

ADOLPH C. HOTTENROTH.

Witnesses:
  Geo. Wm. Miatt,
  Dorothy Miatt.